(12) United States Patent
Nguyen et al.

(10) Patent No.: US 6,790,893 B2
(45) Date of Patent: Sep. 14, 2004

(54) COMPOUND OF INTUMESCENT POWDER AND THERMOPLASTIC MATERIAL

(75) Inventors: Dat. T. Nguyen, Oakville (CA); Kevin B. Langille, Barrie (CA); Dwight E. Veinot, Head of St. Margaret's Bay (CA); Jorgen O. Bernt, Barrie (CA)

(73) Assignee: Pyrophobic Systems Ltd., Barrie (CA)

( * ) Notice: Subject to any disclaimer, the term of this patent is extended or adjusted under 35 U.S.C. 154(b) by 121 days.

(21) Appl. No.: 10/188,922

(22) Filed: Jul. 5, 2002

(65) Prior Publication Data

US 2003/0105188 A1 Jun. 5, 2003

(Under 37 CFR 1.47)

Related U.S. Application Data

(60) Provisional application No. 60/334,064, filed on Nov. 30, 2001.

(51) Int. Cl.[7] .............................. C08K 3/18; C08K 3/34
(52) U.S. Cl. ........................................ 524/430; 524/492
(58) Field of Search ................................. 524/430, 492

(56) References Cited

U.S. PATENT DOCUMENTS 4,888,057 A * 12/1989 Nguyen et al. .......... 106/18.12
6,616,866 B1 * 9/2003 Crompton ................... 252/606
6,645,278 B2 * 11/2003 Langille et al. .......... 106/15.05

OTHER PUBLICATIONS

K. B. Langille et al—Mechanism of dehydration and intumescence of soluble silicates. Part II. Effect of the Cation; Journal of Materials Sciences 26 (1991) 704–710.

* cited by examiner

Primary Examiner—Kriellion A. Sanders
(74) Attorney, Agent, or Firm—Dowell & Dowell, P.C.

(57) ABSTRACT

A compound is provided having the means of intumescence at temperatures above 195° C. to 220° C.

The compound is an intumescent powder defined by the molar ratios (2.20 to 3.70) $SiO_2$/(0.20 to 0.35) $Li_2O$: (0.65 to 0.80)($Na_2O+K_2O$) where the coefficients of $Li_2O$ and of ($Na_2O+K_2O$) total 1.00 and thermoplastic material having a plastic state at less than 195° C. If the thermoplastic contains a halogen, as does Polyvinyl Chloride (PVC) the halogen acts as a flame retardant in the event of combustion and prevents complete burning of the plastic.

If there is as filler mixed with the compound which is endothermic this assists with the fire retardant effect of the compound.

17 Claims, 1 Drawing Sheet

AVERAGE PARTICLE SIZE (MICRONS) BASED ON NORMAL DISTRIBUTION BETWEEN RELEVANT NARROW PARTICLE SIZE RANGES

LEGEND

□ Sample (A) 3.62 $SiO_2$/0.26$Li_2O$:0.22$Na_2O$:0.52$K_2O$

+ Sample (B) 2.48 $SiO_2$/0.26$Li_2O$:0.74$Na_2O$:0.00$K_2O$

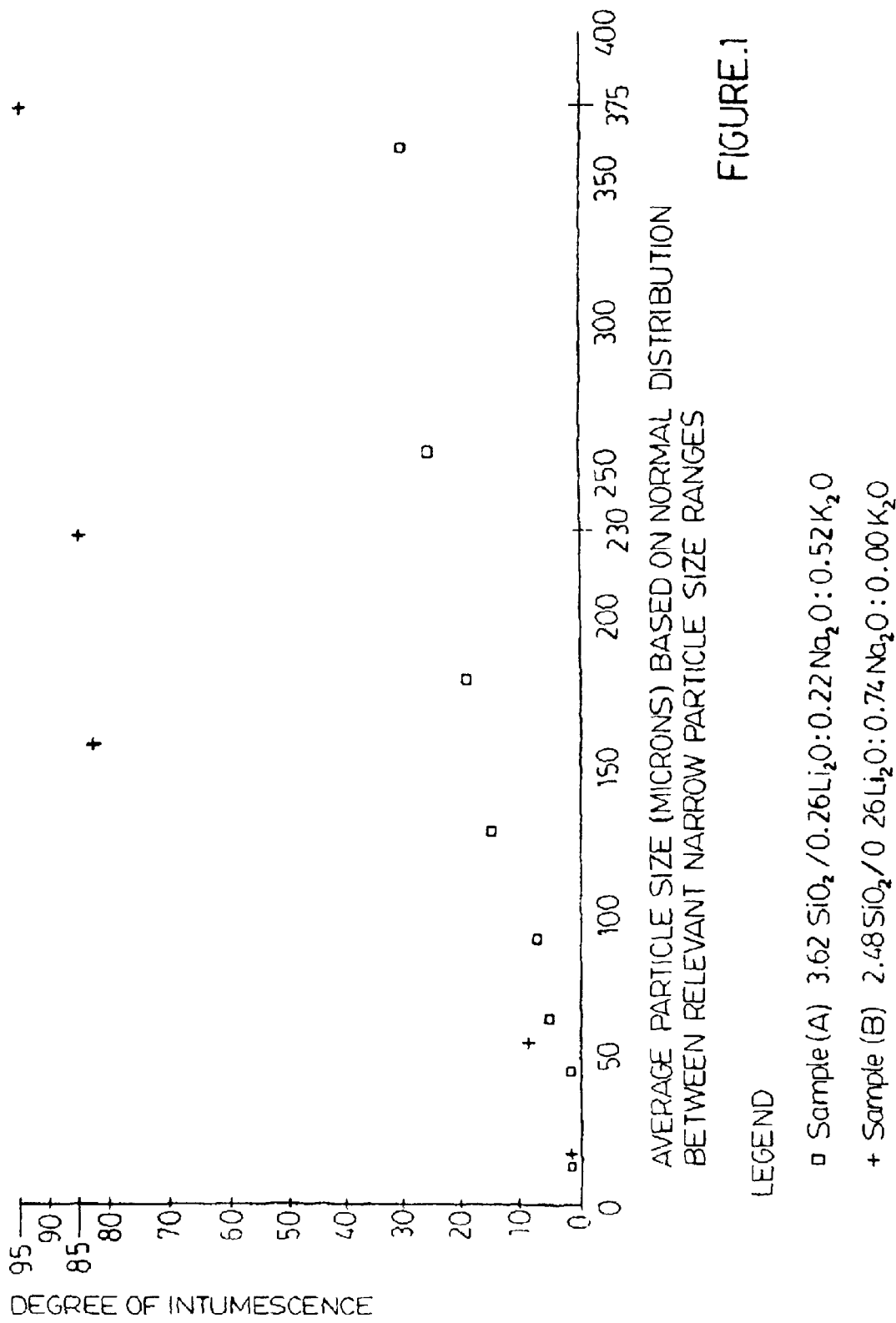

COMPOUND OF INTUMESCENT POWDER AND THERMOPLASTIC MATERIAL

CROSS REFERENCE TO RELATED APPLICATIONS

This application claims benefit of provisional application Serial No. 60/334,064 filed Nov. 30, 2001.

BACKGROUND OF INVENTION

Field of the Invention

This invention relates to a compound of an intumescent powder and a thermoplastic material and to the method of making the compound.

Intumescent powders when heated above their temperatures of intumescence swell to several or many times their volume. In accord with this invention they are mixed with a thermoplastic material to form a compound which may be molded to form articles which, in case of fire, swell to close apertures, floor or wall passages, wall spaces, door fittings, containers, anchor loose products or the like, to lower the chances of fire damage.

An intumescent powder contained in a thermoplastic matrix is of considerable use for the provision of articles for such uses as those recited above in potential fire vulnerable areas where the intumescent-thermoplastic compound will lessen the risk of fire, or fire damage or fire Customarily the thermoplastic material is heated to a plastic state for mixing with an intumescent powder. Such mixing must take place at a temperature below the intumescence temperature of the powder to avoid premature intumescence. Thus the only thermoplastics which can be useful for mixture with the powder are those whose plastic state occurs at temperature lower than the powder's intumescence temperature. By 'plastic' or 'plastic state' herein we mean in a condition capable of being molded or formed.

Heretofore the intumescent powders available had an intumescent point of 120° C. to 140° C. This limited the thermoplastic materials to which could be combined with prior art powders typically room temperature curing materials such as: rubber, latex, silicone and other materials which cure below 120° C.

We have developed an intumescent powder with an intumescent point of about 195° C. to 220° C. As a result thermoplastic materials which are plastic below 195° C. are now available for mixing (referred to herein as "compounding" because of the high viscosity of the flowable thermoplastic) and are very suitable for making the products, such as those recited above which reduce fire vulnerability. The intumescent powder is preferably 5 to 50% by weight of the mixture of powder, on the one hand, and thermoplastic and any filler on the other. The percentage of powder may be used to determine the swelling of a molded article in a fire.

The product of the compounding may be pelletized or chipped and then processed by extrusion injection molding, or other process to form the articles discussed.

The novel intumescent powder comprises alkali silicate powder containing a relatively significant amount of lithium oxide; the alkali silicate having a high degree of intumescence and a temperature of intumescence above the plastic temperature of thermoplastic materials such as those listed above.

The alkali silicate powder is a mixed Li/Na/K silicate. (For use in the inventive powder sodium and potassium are almost equivalent on a mole to mole basis so that it is not thought necessary in connection with this invention to specify them separately but merely to specify the content by molecular fraction of the sum of the sodium and potassium molar values relative to the content of the other ingredients.)

Two main factors influence the characteristics of the mixed Li:Na:K silicates of the alkali silicate powder. One is the silica to cation oxide molar ratio which can be expressed as the ratio y $SiO_2.M_2O$ where y is part of the numerator of the ratio when the denominator is 1.00; and where $M_2O$ (equal to 1.00) is the total metal oxide which may include a $Li_2O$, b $Na_2O$, and c $K_2O$ when a, b, c are the relative molar quantities of the cation oxides and total 1.00. The molar ratios herein are considered to be accurate to plus or minus 2%.

The other is the ratio of cation oxide a $Li_2O$: b $Na_2O$: c $K_2O$. The relative quantities of a $Li_2O$, b $Na_2O$, and c $K_2O$ total units as the denominator ($M_2O$=1.00) for the ratio $SiO_2:M_2O$ in the ratio described.

In view of the similarity in effects between sodium and potassium; the molar ratio—a $Li_2O$, b $Na_2O$, and c $K_2O$ may be written as: a $Li_2O$: d ($Na_2O+K_2O$) (where d is the sum of b and c in moles) and a+d=1.00.

For brevity it is sometimes herein desired to indicate the mixture numerically only. For example a ratio 3.00/0.31:0.33:0.35 shall be read herein to indicate 3.00 $SiO_2$/0.31$Li_2O$:0.33 $Na_2$:0.35 $K_2O$ and the ratio 3.00/0.31:0.69 shall be interpreted to indicate the molar ratio 3.00 $SiO_2$/0.31 $LiO_2$:0.69 ($Na_2O+K_2O$).

The tests conducted on the water solubility of ternary Li/Na/K silicates indicate that potassium and sodium silicates are similar in solubility.

The formulations of the intumescent powder within the scope of the invention range over the molar ratios (2.20 to 3.70) $SiO_2$/(0.20–0.35)$Li_2O$:(0.80 to 0.65)($Na_2O+K_2O$) where the coefficients of $Li_2O$ and ($Na_2O+K_2O$) are chosen so that their sum equals 1.00 These are dried to a moisture content of 8–12% by weight and preferably ground to 50 to 500 microns.)

The formulation ratios are accurate to about 2 parts in 100 which is the commercial standards of accuracy for the materials specified and constitutes the tolerated variation in the ratios as expressed in the specification and claims.

The preferred limits of the formulations may be commented on as follows. For values of $SiO_2$ below 2.20 the temperature of intumescence is lower than desired. Also the product tends to be less water resistant, and more readily efflorescent and more hygroscopic. For values of $SiO_2$ above 3.70 the degree of intumescence is less than desired although there is good water resistance, low efflorescence and less hygroscopic effect.

For values of $Li_2O$ less than 0.20 it should be realized that substantially all the water remaining after drying (discussed hereafter) is linked to the $Li_2O$, thus the decrease in the $Li_2O$ to less than 0.20 contemplated above is linked to a smaller amount of water which may be insufficient to cause a desirable degree of intumescence.

For values of $Li_2O$ greater than 0.35 the degree of intumescence is reduced below the limits desired.

For use with the newly developed thermoplastic powder, thermoplastic materials such as: polyvinyl chloride (PVC), polyethylene and polypropylene have been most commonly used. Examples of other thermoplastic materials which can be compounded with the novel powder include: ethyl vinyl acetate (EVA), acrylonitrile butadiene styrene (ABS) copolymers, polyethylene acrylates, and thermoplastic polyester. There are other thermoplastic materials with which the powder may be combined.

Of the thermoplastic materials we prefer to use PVC. When the PVC is heated to combustion temperatures chlorine is released which acts as a flame suppressant. Moreover the PVC does not completely burn and lends coherence to the char caused by intumescence.

The compounded powder and thermoplastic material may be mixed with a filler. The filler may be used to save expense of thermoplastic and clay may be used for this purpose. In other applications we prefer to use as filler alumina trihydrate since it is endothermic, releasing moisture when heated to combustion temperature, and hence the alumina trihydrate adds to the fire retardant properties of the compounded material.

The intumescent plastic compound is made by grinding the dried intumescent powder to the desired size. Ranges of 50 to 500 microns have been considered. However at sizes over 500 microns the compound containing the powder is difficult to mold. At sizes below 150 microns the intumescence is reduced. A preferred compound is (Sample '(B)' hereafter) with a formulation 2.48 $SiO_2$/0.26 $Li_2O$:0.74 $(Na_2O+K_2O)$. Also with increased grinding the percentage of 'fines' (about −140 mesh 106 microns) becomes proportionately high and the fines tend to clog the separating screens. Thus we prefer to use powder of minus 35 mesh (less than 500 microns) which has an average size of 325 microns. At average size of about 325 microns the degree of intumescence is 80–110 (depending on the heating rate and water content) In spite of the objections to fine powder expressed herein we have employed powders of as low as 20 microns for coating fine wire.

FIG. 1 is a graph showing the variation in degree of intumescence with particle size for powder uncompounded; Sample (A): 3.62 $SiO_2$/0.26 $Li_2O$:0.74:$(Na_2O+K_2O$ and Sample (B): 2.48 $SiO_2$/0.26 $Li_2O$:0.74 $(Na_2O+K_2O)$.

These are two of the preferred formulations for intumescent powder. 'Cross points' at the upper right of the Sample (B) graph are average particle size 230 microns, degree of intumescence 85 times and average particle size 375 microns, degree of intumescence 95 times. The average particle size shown in FIG. 1 and for Samples (A) and (B) is based on normal distribution between relevant narrow particle size ranges.

As, at least partially demonstrated by the graph, the degree of intumescence increases with particle size. It will be noted that Sample (B) has a much higher degree of intumescence than Sample (A). It should be noted that any formulation within the invention range may be used as all have a temperature of intumescence at or above 195° C. hence above the plastic state temperature range of the thermoplastic to be used.

Sample (B), with the higher degree of intumescence, has lower resistance than Sample (A) to water (i.e. solubility), efflorescence and water absorption. In the compound of this invention however the effects of these relative disadvantages are very much lessened since the compounded powder will be sealed from the atmosphere by a thermoplastic matrix.

The Sample (B) compound formulation is preferably prepared as follows:

20 lbs of intumescent powder (2.48 $SiO_2$)0.26 $Li_2O$: 0.74 $(Na_2O+K_2O)$ ground to 50 to 500 microns, 20 lbs alumina trihydrate AC410; Manufacturer: AluChem Inc., Reading, Ohio, U.S.A.;

60 lbs PVC (PolyOne M3900); PolyOne Corp.

The alumina trihydrate should be dried to remove free moisture (150° C. for 16 hours has been found satisfactory). With the powder and PVC it is then compounded with compounder barrel temperatures in the 170° C. to 177° C. range. The compounded material is then pelletized or chipped and then can be injection molded or equivalent for forming into the desired article.

The PVC besides forming a matrix for the powder and filler, in the event of a fire, gives off chlorine which acts as a flame suppressant as previously explained and thus contributes to the fire retardant properties of the finished articles. The alumina trihydrate, besides acting as a filler, gives off water at combustion temperature and thus is endothermic and assists as a fire retardant.

Intumescence has been observed to occur at 210° C. TO 220° C. However the temperature of intumescence will vary with variation of water content for samples (A) and (B) and the temperature of intumescence may vary. 195° C. is felt to be a practical higher limit for the 'plastic states' of thermoplastics mixed with the powder.

When the compounded plastic is mixed with an intumescent powder with a high silicon oxide formulation (e.g. 3.62 $SiO_2$/0.26 $Li_2O$: 0.74 $(Na_2O+K_2O)$) it may happen that the glass bubbles do not co-adhere in the event of a fire. Then the intumesced product will tend to fall apart rather than form the solid char structure desired. This may be avoided by including with the formulation some low temperature frit (such as borax) (which does not affect the formulation) but does tend to create co-adherence between glassy bubbles. Moreover when PVC is used as the thermoplastic, the PVC does not completely burn and the residue tends to hold powder particles together.

We claim:

1. Compound comprising a thermoplastic material mixed with an intumescent powder where the temperature of intumescence of the powder is greater than the plastic state point of the thermoplastic material, where the intumescent powder is substantially defined by molar ratios (2.20 to 3.70) $SiO_2$/(0.20 to 0.35) $Li_2O$: (0.65 to 0.80)$(Na_2O+K_2O)$ where the coefficients $Li_2O$ and $(Na_2O+K_2O)$ total 1.00, and where the formulation ratios are accurate within plus or minus 2%.

2. Compound comprising a thermoplastic material being plastic at temperature point lower than 195° C. compounded with intumescent powder having an intumescence point at or higher than 195° C., wherein the intumescent powder is substantially defined by molar ratios (2.20 to 3.70) $SiO_2$/(0.20 to 0.35) $Li_2O$:(0.65 to 0.80)$(Na_2O+K_2O)$ where the coefficients $LiO_2$ and $(Na_2O+K_2O)$ total 1.00, and where the formulation ratios are accurate to plus or minus 2%.

3. Compound as claimed in claim 1 where the intumescent powder is substantially defined by the molar ratio 2.48 $SiO_2$/0.26 $Li_2O$:0.74 $(Na_2O+K_2O)$ where the molar ratios are accurate within plus or minus 2%.

4. Compound as claimed in claim 1 where the intumescent powder is substantially defined by the molar ratio 3.62 $SiO_2$/0.26 $Li_2O$:0.74 $(Na_2O+K_2O)$ where the molar ratios are accurate within plus or minus 2%.

5. Compound as claimed in claim 1, wherein the intumescent powder is ground to the size of about 50 to 500 microns.

6. Compound as claimed in claim 2, wherein the intumescent powder is ground to the size of about 50 to 500 microns.

7. Compound as claimed in claim 1, wherein the intumescent powder is between 5 and 50% by weight of the mixture.

8. Compound as claimed in claim 2, wherein the intumescent powder is between 5 and 50% by weight of thermoplastic plus any filler.

9. Compound as claimed in claim 1, wherein the said powder and thermoplastic material are compounded with a filler.

10. Compound as claimed in claim 2, wherein the said powder and thermoplastic material are compounded with a filler.

11. Compound as claimed in claim 1, wherein the thermoplastic material is mainly PVC.

12. Compound as claimed in claim 2, wherein the thermoplastic material is mainly PVC.

13. Method of providing an intumescent article comprising the steps of: providing a powder comprising $SiO_2/Li_2O$: $(Na_2O+K_2O)$ in molar ratios plus or minus 2% (2.20 to 3.70) $SiO_2/(0.20$ to $0.35)Li_2O$: $(0.65$ to $0.80)(Na_2O+K_2O)$, where the coefficients of $Li_2O$ and $(Na_2O+K_2O)$ are substantially 1.00, drying it to a moisture content of 8 to 12% by weight,
grinding it to a size 50 to 500 microns,
compounding it with a thermoplastic material in a ratio of 5 to 50% by weight of intumescent powder to 95 to 50% by weight of thermoplastic and filler.

14. Method as claimed in claim 12, wherein the powder is ground to about 500 microns.

15. Method as claimed in claim 13, wherein the filler is endothermic.

16. Method as claimed in claim 13, wherein the molar ratio of $SiO_2$ is substantially 2.48 plus or minus 2%.

17. Method as claimed in claim 13, wherein the molar ratio of $SiO_2$ is substantially 3.62 plus or minus 2%.

* * * * *